United States Patent [19]

Chubb

[11] Patent Number: 4,528,417
[45] Date of Patent: Jul. 9, 1985

[54] THERMIONIC-PHOTOVOLTAIC ENERGY CONVERTER

[75] Inventor: Donald L. Chubb, Olmsted Falls, Ohio

[73] Assignee: The United States of America as represented by the Administrator of the National Aeronautics and Space Administration, Washington, D.C.

[21] Appl. No.: 580,573

[22] Filed: Feb. 15, 1984

[51] Int. Cl.³ ............................................. H01L 31/00
[52] U.S. Cl. .................................................. 136/253
[58] Field of Search ............................. 136/253, 254

[56] References Cited

U.S. PATENT DOCUMENTS

| 3,433,676 | 3/1969 | Stein | 136/253 |
|---|---|---|---|
| 3,462,310 | 8/1969 | Rubenstein | 136/253 |
| 3,751,303 | 8/1973 | Kittl | 136/253 |
| 3,929,510 | 12/1975 | Kittl | 136/247 |
| 4,234,352 | 11/1980 | Swanson | 136/253 |
| 4,313,425 | 2/1982 | Crackel et al. | 126/438 |
| 4,316,048 | 2/1982 | Woodall | 136/253 |

OTHER PUBLICATIONS

A. E. Von Doenhoff et al., *IRE Trans. Military Electronics*, Apr. 1959, pp. 46-51.

Primary Examiner—Aaron Weisstuch
Attorney, Agent, or Firm—Gene E. Shook; John R. Manning

[57] ABSTRACT

A thermionic-photovoltaic energy conversion device comprises a thermionic diode 10 mounted within a hollow tubular photovoltaic converter 12. The thermionic diode maintains a cesium discharge for producing excited atoms that emit line radiation in the wavelength region of 850 nm to 890 nm. The photovoltaic converter is a silicon or galium arsenide photovoltaic cell 22 having bandgap energies in this same wavelength region for optimum cell efficiency.

18 Claims, 4 Drawing Figures a# THERMIONIC-PHOTOVOLTAIC ENERGY CONVERTER

DESCRIPTION

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with the direct conversion of thermal energy to electrical energy. More particularly, the invention is directed to an improved energy converter which utilizes both thermionics and photovoltaics.

Thermionic energy converters and photovoltaic devices have been used separately in the past. A conventional thermionic diode converts the thermal energy of emitted electrons in a cesium plasma directly into electrical energy. A photovoltaic device converts radiant energy into electrical energy.

It is, therefore, an object of the present invention to provide a thermionic-photovoltaic energy conversion device having a photovoltaic cell that is isolated from the high temperature portion of the system so that electrical energy is produced at low temperatures. This results in long life and reliability.

PRIOR ART

Rubenstein U.S. Pat. No. 3,472,310 discloses apparatus for the conversion of solar energy into electrical energy using a cesium atmosphere. The solar energy is used to maintain a cesium plasma in which charge separation is maintained so that useful electrical power can be obtained from the charge separation electric field. Cesium plasma is not produced thermionically and cesium line radiation is not used to drive a photovoltaic cell.

Stein U.S. Pat. No. 3,433,676, Kittl U.S. Pat. Nos. 3,751,303 and 3,929,510, Swanson U.S. Pat. No. 4,234,352 and Woodall U.S. Pat. No. 4,316,048 describe thermophotovoltaic converters of various types. Such converters generally employ sunlight and, in some instances, a fuel burning cell as an energy source. These converters provide for the conversion of the radiant energy so produced into a form that can best be utilized by a photovoltaic (silicon) cell. In thermophotovoltaic devices, thermal input energy is used to heat a solid emitter. The purpose of the emitter is to produce radiation at wavelengths where photovoltaic cells are efficient. Either blackbody or broad-band emitters are used.

DISCLOSURE OF THE INVENTION

The thermionic-photovoltaic energy conversion device of the present invention uses electron thermal energy to produce excited atoms which then emit line radiation. A photovoltaic cell converts this line radiation into electrical energy.

The thermionic-photovoltaic energy conversion device comprises two interdependent portions. The first is in the form of a discharge region in which a cesium discharge is maintained by thermionically emitted electrons similar to a conventional thermionic diode. The second portion comprises a photovoltaic cell.

The performance of this thermionic-photovoltaic energy conversion device is superior to that of a thermophotovoltaic energy conversion device because the line radiation from the cesium discharge is in the wavelength region of 850 nm to 890 nm. At such a wavelength silicon and gallium arsenide photovoltaic cells have their maximum efficiency. In contrast, a thermophotovoltaic energy conversion device produces radiation over a broad wavelength range. A large portion of this radiation cannot be utilized by the photovoltaic cell. Also the thermionic-photovoltaic devices do not require highly efficient optical filters necessary in the thermophotovoltaic devices.

BRIEF DESCRIPTION OF THE DRAWING

The advantages and novel features of the invention will be more fully apparent from the following detailed description when read in connection with the accompanying drawings wherein.

BEST MODE FOR CARRYING OUT THE INVENTION

Figure 1:
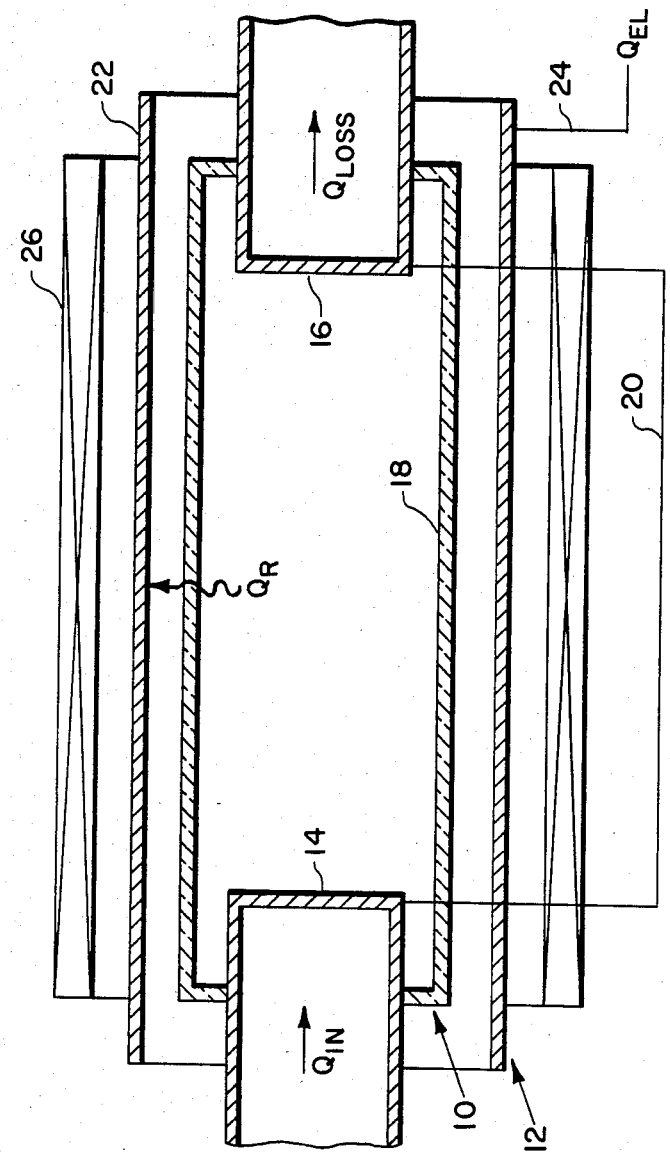
FIG. 1 is a longitudinal section view of a thermionic-photovoltaic (TEP) energy conversion device constructed in accordance with the present invention.

Referring now to FIG. 1 there is shown a thermionic-photovoltaic energy conversion device constructed in accordance with the invention. This device combines a thermionic diode portion 10 with a photovoltaic converter portion 12.

The thermionic diode 10 comprises an emitter electrode 14 and a collector electrode 16 spaced therefrom. The emitter and the collector are mounted within a closed tubular housing 18 containing cesium. A lead 20 electrically connects the emitter and collector in a manner well known in the art.

The emitter electrode 14 is preferably tungsten while the collector electrode 16 is preferably molybdenum. The housing 18 is of a transparent material, such as glass or sapphire, that has high optical transmission in the 850 nm–890 nm wavelength region.

The photovoltaic converter portion 12 is a silicon or gallium arsenide photovoltaic cell 22 having a tubular configuration. The electrical power output ($Q_{e1}$) of the photovoltaic cell 22 is connected to a load in a manner well known in the art by a suitable lead 24. The thermionic diode portion 10 is mounted within the photovoltaic converter portion 12 so that the photovoltaic cell 22 surrounds the chamber formed by the housing 18.

An axial magnetic field is provided by a suitable magnet 26 to reduce losses from electron thermal diffusion to the housing 18. This magnetic field can be produced by an electromagnetic coil or by a set of permanent magnets. It is further contemplated that the magnet 26 may be unnecessary in certain applications.

As input power ($Q_{in}$) heats the emitter electrode 14, electrons are emitted from its surface. These electrons move within the chamber formed by the housing 18 to the molybdenum collector electrode 16, which is maintained at a temperature lower than the emitter. These thermionically emitted electrons maintain a cesium discharge within the chamber. The heat ($Q_{loss}$) that must be removed to maintan the collector temperature is the major loss in the system. In order to attain efficient operation, the emitter must be at a temperature at least 1800° K. The collector must be maintained at approximately 1000° K.

In the discharge region, between the emitter electrode 14 and the collector electrode 16, electron collisions with ground state atoms will produce excited atoms. These excited atoms radiate power ($Q_r$) in a narrow wavelength band. This invention relies on the fact that cesium's lowest excited states emit radiation in the 850 nm–890 nm wavelength region. This range matches the bandgap energies of both silicon (Si) and gallium arsenide (GaAs). Because both silicon and gallium arsenide alloy photovoltaic cells are most efficient in this wavelength region, the energy conversion occurs at the cell's highest efficiency. Therefore, the discharge region is surrounded by either a Si or GaAs photovoltaic cell to convert the photon energy to electrical energy.

In a conventional thermionic diode the electron energy that results in atomic excitation is a loss. This loss plus ionization and gas heating losses are minimized by keeping the gap between the diode electrodes small. Conversely, for an efficient TEP converter, it is necessary to convert as much of the electron thermal energy as possible to atomic excitation energy. Therefore, a large gap between the emitter electrode 14 and the collector electrode 16 is essential. As a result, related shorting and mechanical problems are eliminated. This promotes long life of the thermionic-photovoltaic energy conversion device of the present invention.

DESCRIPTION OF AN ALTERNATE EMBODIMENT

Figure 2:
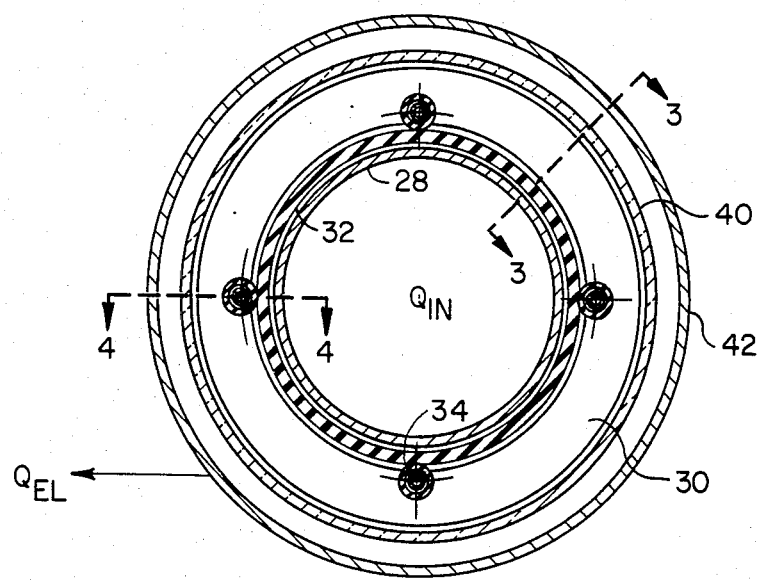
FIG. 2 is a transverse section view of an alternate embodiment of a TEP energy conversion device embodying the features of the present invention.
Figure 4:
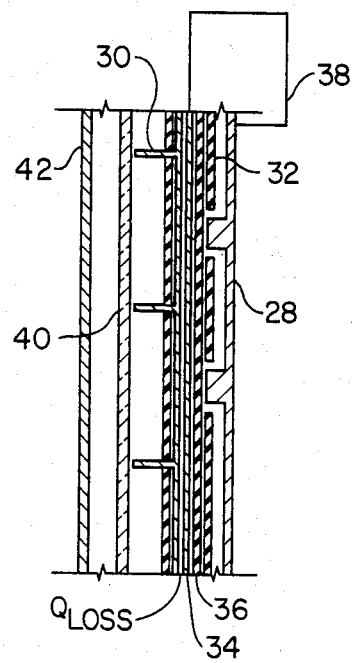
FIG. 4 is a longitudinal section view taken along the line 4—4 in FIG. 2.
Figure 3:
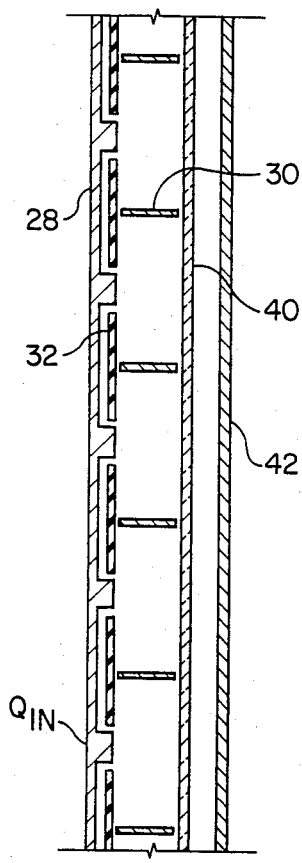
FIG. 3 is a longitudinal section view taken along the line 3—3 in FIG. 2.

Referring now to FIG. 2 there is shown an alternate embodiment of a thermionic-photovoltaic energy converter constructed in accordance with the present invention. This embodiment is preferred in certain applications where the geometry is more suitable for coupling to a heat source ($Q_{in}$). Also, a higher output power density ($Q_{el}$) may be attained with this embodiment.

The principle of operation of the annular device shown in FIG. 2 is the same as that of the planar device shown in FIG. 1. However, this embodiment has an emitter 28 in the form of an annular tungsten tube. The heat input ($Q_{in}$) flows down the centerline of the device. A molybdenum collector 30 is a series of rings separated from the emitter 28 by insulating rings 32.

The collector rings 30 are held by four molybdenum tubes 34 which are enclosed in insulating tubes 36. Cooling fluid is circulated through the molybdenum tubes 34 in order to maintain the proper collector temperature of about 1000° K. An electrical lead 38 connects the four molybdenum collector tubes to the emitter tube.

An optically transparent window 40 surrounds the cesium discharge. The window 40 may be either glass or sapphire. Outside the window 40 is the Si or GaAs photovoltaic cell 42 which converts the line radiation to electrical power.

While the preferred embodiment of the invention has been shown and described, it will be appreciated that various structural modifications may be made to the thermionic photovoltaic energy conversion device without departing from the spirit of the invention and the scope of the subjoined claims.

I claim:

1. A thermionic-photovoltaic energy conversion device comprising
    thermionic means for providing a discharge that produces line radiation in a relatively narrow range of wavelengths, and
    photovoltaic means isolated from said thermionic means and responsive to said wavelengths in said relatively narrow range for converting photons in said line radiation into electrical energy.

2. A device as claimed in claim 1 wherein said thermionic means includes a cesium discharge means.

3. A device as claimed in claim 2 wherein the cesium discharge means includes means for thermionically emitting electrons.

4. A thermionic photovoltaic energy conversion device comprising
    a thermionic diode including
        a material for producing a discharge emitting a line radiation in a predetermined range of wavelengths,
        a pair of spaced electrodes for maintaining said discharge, and
        a housing of a transparent material that has high optical transmission in said predetermined range of wavelengths for enclosing said spaced electrodes and said discharge, and
    a photovoltaic converter of a material having bandgap energies matching the wavelengths in said predetermined range adjacent to and isolated from said thermionic diode for converting photon energy of said line radiation that is transmitted through said housing to electrical energy.

5. A device as claimed in claim 4 wherein the transparent housing contains cesium for producing the discharge.

6. A device as claimed in claim 5 wherein said spaced electrodes include an emitter electrode of tungsten and a collector electrode of molybdenum.

7. A device as claimed in claim 6 including means for heating the emitter electrode to a temperature greater than 1800° K.

8. A device as claimed in claim 6 including means for cooling the collector electrode and maintaining the same at a temperature of about 1000° K.

9. A device as claimed in claim 5 wherein the photovoltaic converter is made of silicon.

10. A device as claimed in claim 5 wherein the photovoltaic converter is made of gallium arsenide.

11. A device as claimed in claim 4 including means for providing an axial magnetic field between the spaced electrodes.

12. A device as claimed in claim 4 wherein both the housing and the photovoltaic converter have tubular configurations with the housing being mounted within the converter.

13. A device as claimed in claim 12 wherein the emitter has a tubular configuration.

14. A device as claimed in claim 13 wherein the collector comprises a plurality of spaced rings extending radially outward from the emitter and insulated therefrom.

15. In combination with a hollow tubular photovoltaic converter of the type responsive to line radiation having wavelengths in a predetermined narrow range, a source of radiation comprising a supply of atoms enclosed by a transparent housing within said hollow tubular photovoltaic converter for producing line radiation in said ranges when excited, and a source of electron thermal energy within said transparent housing for exciting said atoms.

16. The combination as claimed in claim 15 including a supply of cesium atoms within the transparent housing for producing the line radiation during discharge.

17. The combination as claimed in claim 16 including a thermionic diode for maintaining a cesium discharge.

18. The combination as claimed in claim 17 wherein said transparent housing is a closed tubular housing mounted within and spaced from the hollow tubular photovoltaic converter for containing the cesium atoms and the thermionic diode, said housing having high optical transmission in the predetermined wavelength range.

* * * * *